(12) United States Patent
Helms et al.

(10) Patent No.: US 7,387,414 B2
(45) Date of Patent: Jun. 17, 2008

(54) LIGHT BAR FOR MOUNTING TO A VEHICLE

(75) Inventors: James Helms, Fort Meyers, FL (US); Thomas G. Buckner, Gibsonia, PA (US)

(73) Assignee: IBIS TEK, LLC, Butler, PA (US)

( * ) Notice: Subject to any disclaimer, the term of this patent is extended or adjusted under 35 U.S.C. 154(b) by 0 days.

(21) Appl. No.: 11/725,580

(22) Filed: Mar. 19, 2007

(65) Prior Publication Data
US 2008/0019141 A1    Jan. 24, 2008

Related U.S. Application Data

(60) Provisional application No. 60/785,210, filed on Mar. 22, 2006.

(51) Int. Cl.
*F21V 33/00* (2006.01)
(52) U.S. Cl. .................. 362/493; 362/544; 362/288
(58) Field of Classification Search ............... 362/493, 362/543, 544, 249, 228, 230, 231
See application file for complete search history.

(56) References Cited

U.S. PATENT DOCUMENTS

2005/0128751 A1* 6/2005 Roberge et al. ............. 362/276

* cited by examiner

*Primary Examiner*—Laura Tso
(74) *Attorney, Agent, or Firm*—Ware, Fressola, Van Der Sluys & Adolphson LLP

(57) ABSTRACT

A kit for a front and/or rear light bar, for providing auxiliary illumination for a vehicle in the forward and/or rearward direction. The light bar typically includes several high intensity flood lights and two infrared illuminator modules, i.e. infrared lights. A switch box is provided for placing in the cabin of the vehicle for turning on and off the lights. A light bar, typically a front light bar, can be provided with strobe lights in place of some of the flood lights. A shield is provided as part of a front light bar to protect the lights when not in use, and to keep the lights from striking the front of the vehicle.

5 Claims, 5 Drawing Sheets

LIGHT BAR FOR MOUNTING TO A VEHICLE

CROSS REFERENCE To RELATED APPLICATION

Reference is made to and priority claimed from U.S. provisional application Ser. No. 60/785,210 filed Mar. 22, 2006.

BACKGROUND OF THE INVENTION

1. Technical Field

The present invention pertains to the field of lighting equipment, and in particular for lighting equipment mounted to a vehicle.

2. Problem Solved by the Invention

Lights provided as standard with some military vehicles, and in particular the HMMWV (High Mobility Multipurpose Wheeled Vehicle), are of relatively low intensity and typically provide illumination in only the visible spectrum. In addition, they are intended to be used in a non-flashing mode when the vehicle is in operation.

In many circumstances, it is advantageous for a vehicle, and especially a military vehicle such as the HMMWV, and especially in combat operations, to provide illumination of greater intensity than comes standard. It is also advantageous to provide illumination in the infrared. Finally, for some applications, flashing lights of various colors are useful.

What is therefore needed is a way to upfit such vehicles with such non-standard lighting.

DISCLOSURE OF INVENTION

The invention provides a light bar that can attach to the front of a vehicle, on top of the cabin, and that provides one or more of typically two or more floodlights, a pair of infrared lights, and a pair of colored flashing lights (e.g. a pair of two blue flashing lights, or a red flashing light and a blue flashing light).

In some embodiments, the invention also provides a light bar that can mount on the back portion of a vehicle to provide illumination, including infrared illumination, in the rearward direction.

In addition, the invention provides equipment for mounting the light bars to a vehicle, equipment for providing electric power to the light bars, and equipment for turning on and off the light bars.

BRIEF DESCRIPTION OF THE DRAWINGS

The above and other objects, features and advantages of the invention will become apparent from a consideration of the subsequent detailed description presented in connection with accompanying drawings, in which.

DETAILED DESCRIPTION

Figure 1A:
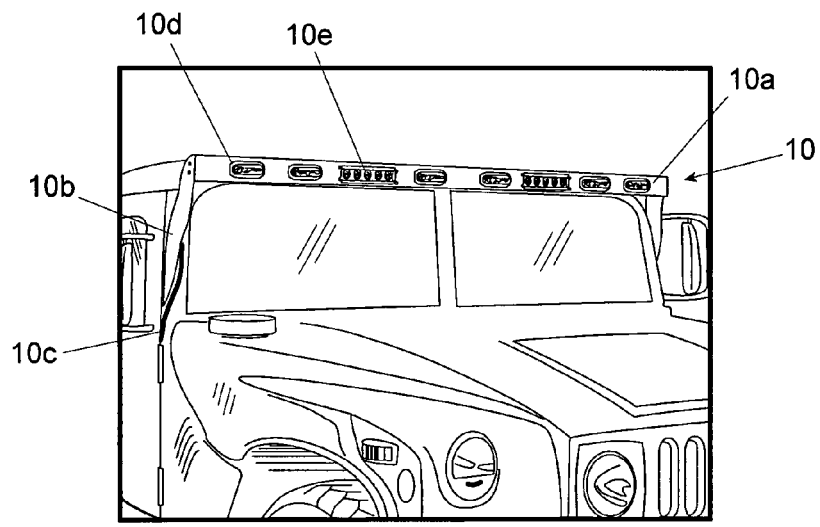
FIG. 1A is a perspective drawing of a front light bar according to the invention, including flood lights and infrared illuminators, mounted on the front of a HMMWV.
Figure 1B:
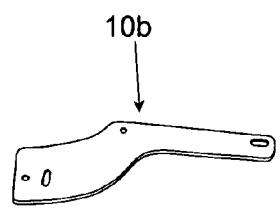
FIG. 1B is a plan drawing of a front mounting bracket, for mounting a front light bar to the front of a HMMWV.

The invention provides a light bar for mounting on a vehicle in either the front of the vehicle or the back of the vehicle. The light bar includes both flood lights and infrared illuminator modules. The invention provides such a light bar for mounting on the front of the vehicle for forward illumination, and a light bar for mounting on the rear of the vehicle for rearward illumination.

A light bar according to the invention is lightweight, inconspicuous, and rugged, and connects directly to the electrical system or battery of the vehicle, i.e. to some electrical power source of the vehicle. The light bar itself is installed in machined aluminum housing. In some embodiments, the flood lights and/or the infrared illuminator modules can be placed in receptacles at different locations in the light bar, to adjust the illumination pattern for wide angle illumination of use for viewing the nearby surrounding area, or for narrow angle viewing of objects at greater distance from the vehicle. In a typical application, the flood lights can be configured so that at 200 m, an 88 m span is illuminated.

The invention is described next in an embodiment for use on a HMMWV, an embodiment that includes both a front light bar and a rear light bar. The invention though, mounts on and is especially designed for any military vehicle, and can also be used in civilian applications. For example, a light bar according to the invention can be used on police or security vehicles, or on the private vehicles of volunteer firemen.

Referring now to FIGS. 1A-D, a light bar 10 according to the invention is shown including a front light bar housing 10a mounted on the front of a HMMWV using two front light bar mounting brackets 10b, one on either end of the light bar. The light bar, in the embodiment shown, includes six high intensity white flood lights 10d and two infrared illuminator modules 10e. The light bar housing 10a with the lights (flood lights and infrared illuminators) mounted therein is here called a light bar kernel.

Figure 3A:
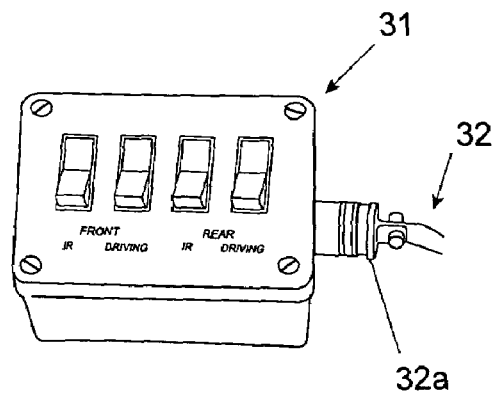
FIG. 3A is a perspective drawing of a switch box, for turning on and off the lights on the front and rear light bar.
Figure 3B:
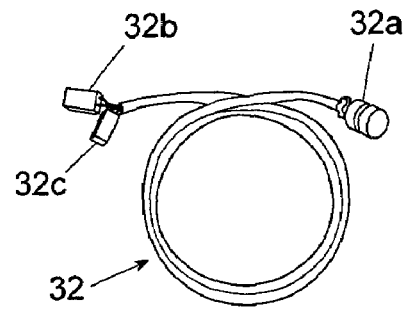
FIG. 3B is a perspective drawing of a cable for connecting the switch box to a power source and to the front and rear light bars.
Figure 4:
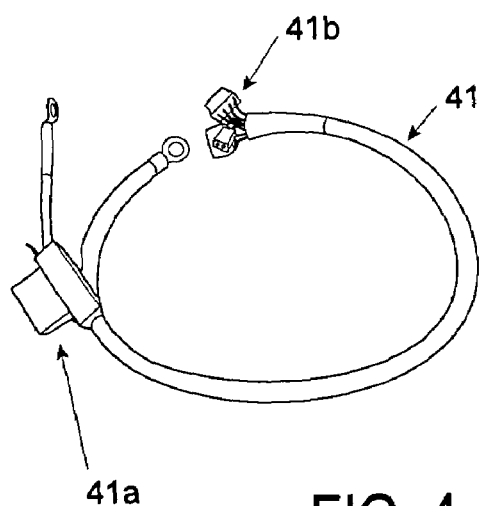
FIG. 4 is a perspective drawing of a cable for connecting the power source to the front and rear light bars and to the switch box (via cables from each).

Referring now also to FIGS. 3 and 4, electrical power and control is provided to the front light bar by cabling 10c, having a cable with a connector 10g for connecting to a battery or to the electrical system of the vehicle via a battery cable 41, and a connector 10h for connecting to a switch box 31 via switch box cabling 32. The switch box 31 is positioned inside the vehicle so as to be accessible to a vehicle operator. Using the switchbox 31, the vehicle operator can open and close relays (not shown) in the front or rear light bar to turn on or off power to either the infrared illuminators or the flood lights. The switchbox is thus connected to the front and rear light bars for providing a control signal, and is connected to the battery or electrical system to obtain the electric power needed to open and close the relays in the light bars. For these connections, the switch box cabling 32 has a connector 32a at one end for connecting to the switch box, and has at the other end a connector 32b for connecting to the battery cabling 41 and a connector 32c for connecting to both light bars (via an adapter, not shown). The battery cabling 41 has at one end two terminals 41a, one for connecting to the positive terminal and one for connecting to the negative terminal of the vehicle battery (or for connecting to another part of the electrical system of the vehicle) and at the other end two connectors 41b, one for connecting to the switch box, and another for connecting to the light bars (via the adapter, not shown). The operating voltage is typically 24 VDC.

The high intensity white flood lights 10d can be conventional flood lights, relying on a filament, or can be high intensity discharge lights, i.e. relying on gas discharge, instead of a filament. Further, and advantageously, the flood lights 10d can be shock mounted in the light bar housing 10a. For example, the flood lights can be held to the light bar housing using (e.g. four) screws, with respective rubber grommets pierced by the screws and isolating the flood lights mechanically from the light bar, and hence from the vehicle itself. Such an arrangement is of use in case of using a light bar according to the invention on a vehicle such as a tank, having less of a shock-absorbing suspension system.

Figure 1C:
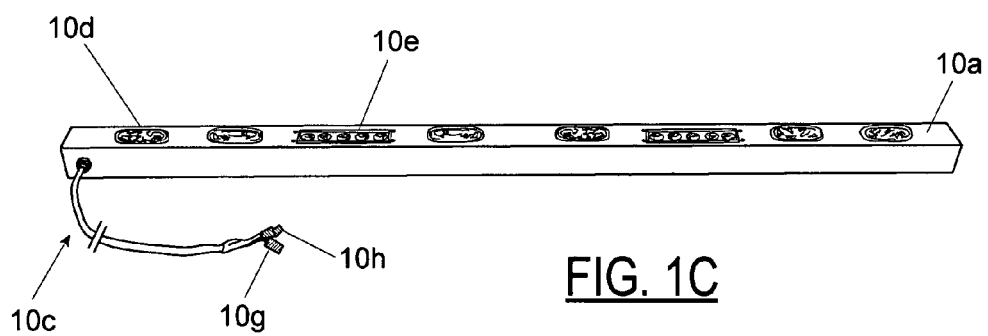
FIG. 1C is a perspective drawing of a front light bar kernel, holding six flood lights and two infrared illuminator modules.

Each infrared illuminator module 10e typically includes five infrared LED's (light emitting diodes), as shown in FIGS. 1A and 1C. In a typical embodiment, the LED's provide illumination at 880 nanometers, to match the light spectrum of night vision equipment typically use by vehicle operators. The infrared illuminators enable driving at normal operating speed when using night vision devices, and enable seeing well beyond what is possible with only night vision goggles.

The front light bar, as described, weighs 22.4 lbs (10.2 kg).

Specifications for an infrared illuminator of a type typically used in the invention are provided in Table 1. An IR illuminator appropriate for use with the invention is e.g. the "Super High-Power GaAlAs IR Emitter" OD-50L, available from Opto Diode Corporation, of NewBury Park, Calif.

TABLE 1

Specifications for typical infrared illuminator modules for use in the front and/or rear light bars.

| Emitting Material | GaAlAs (Gallium Aluminum Arsenide) |
|---|---|
| Half Intensity Beam Angle | 7 deg. |
| Peak Emitting Wavelength | 880 nm |
| Forward Current per diode | 500 mA |
| Peak Forward Current | 10 A |
| Power Distribution | 1000 mW |
| Radiant Intensity | 500 mW/sr |
| Typical total power output | 50 mW for forward current of 500 mA |
| | 600 mw for forward current of 10 A |

Figure 1D:
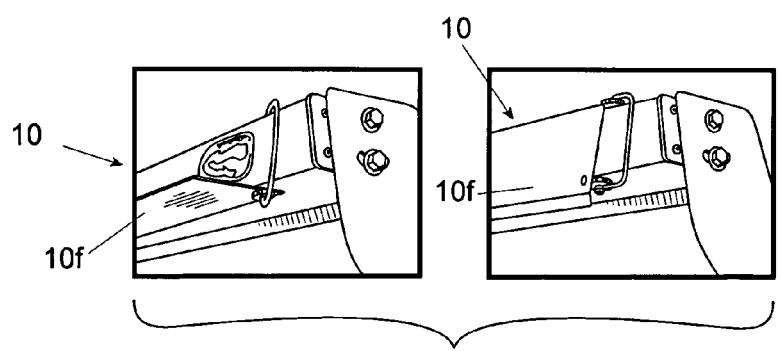
FIG. 1D is a perspective drawing of a front light bar kernel in the deployed configuration and also in the stowed position, where it is protected by a shield.

Referring now in particular to FIG. 1D, in a particularly advantageous embodiment, the light bar is provided so as to have a fold-down shield 10f that protects the lights when not in use, and that eliminates glare caused by light reflecting off the hood of the vehicle when the flood lights are turned on.

Figure 2A:
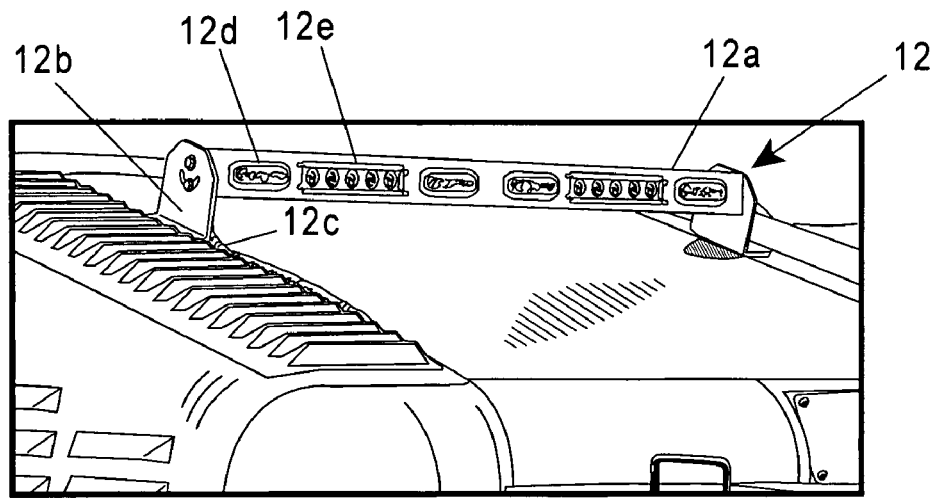
FIG. 2A is a perspective drawing of a rear light bar according to the invention, mounted on the rear of a HMMWV.
Figure 2B:
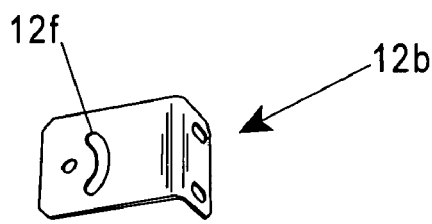
FIG. 2B is a plan drawing of a rear mounting bracket, for mounting a rear light bar to the rear of a HMMWV.
Figure 2C:
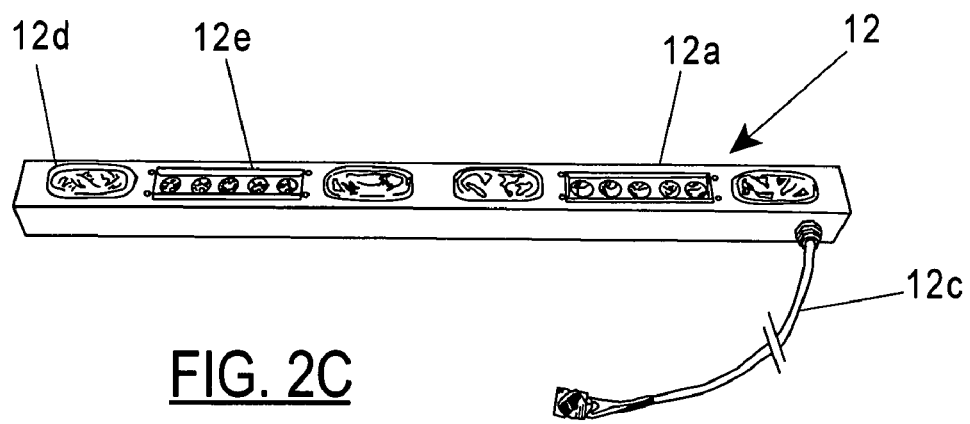
FIG. 2C is a perspective drawing of a rear light bar kernel, holding four flood lights and two infrared illuminator modules.

Referring now to FIGS. 2A-C, the invention can also provide a rear light bar 12, i.e. a light bar for mounting on the rear of the vehicle for providing illumination in the rearward direction. In the embodiment shown in FIGS. 2A-C, the rear light bar includes a rear light bar housing 12a, for holding four flood lights 12d and two infrared illuminator modules 12e. Power and control is provided by rear light bar cabling 12f, connected as described above for the front light bar. The rear light bar housing is mounted to the rear of the HMMWV using two rear mount brackets 12b each having a slotted hole 12f, to enable adjusting the look down angle of the housing and the flood lights and infrared illuminators held in the housing. A rear light bar according to the invention typically weighs approximately 14.2 lbs. (6.4 kg).

Figure 5A:
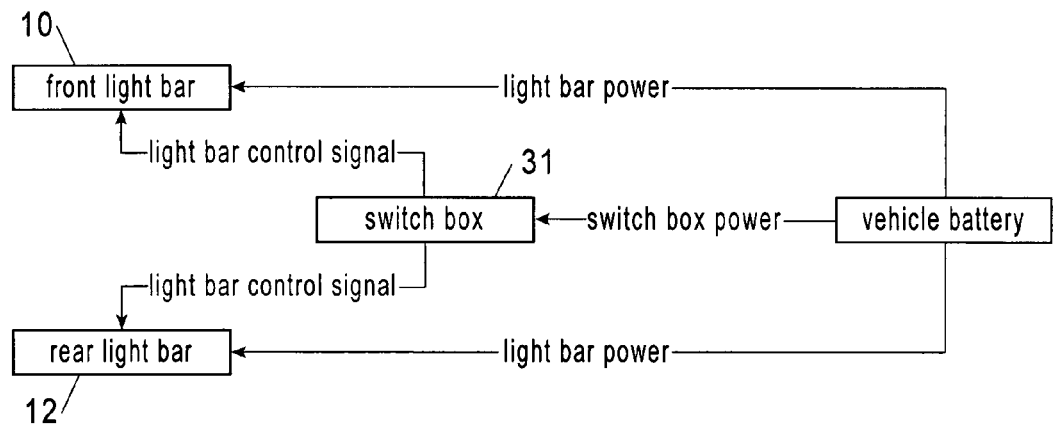
FIG. 5A is a block diagram/flow diagram illustrating cabling from a functional perspective.
Figure 5B:
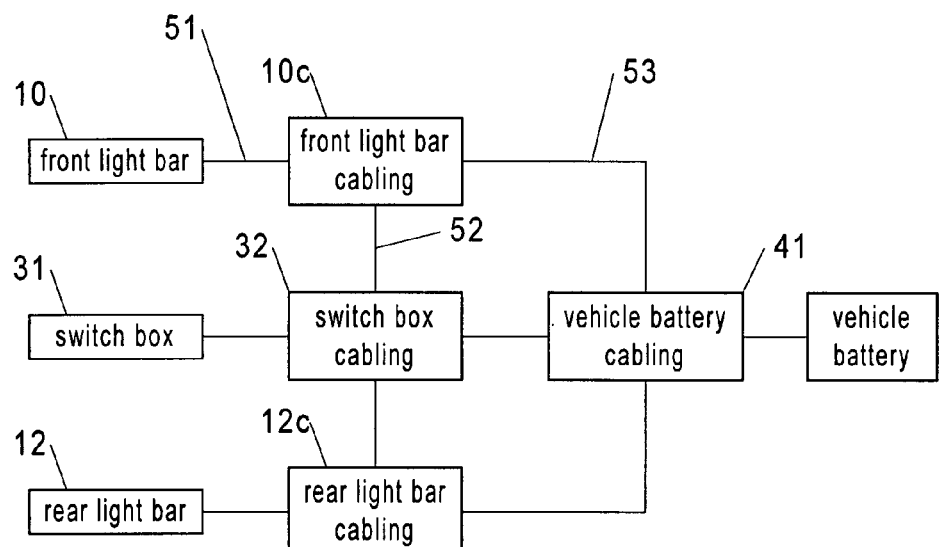
FIG. 5B is a block diagram illustrating the physical interconnections of the cabling.

Referring now to FIG. 5A, the connections of the cabling 10c 12c 32 and 41 described above provide, as also described above and illustrated in FIG. 5A, an electrical connection from the switch box 31 to the vehicle battery (or electrical system) for power to the switch box, electrical connections from the switch box to the front and rear light bars 10 and 12 for providing control signals thereto, and electrical connections of the battery (or vehicle electrical system) to the front and rear light bars for providing power to the light bars. As shown in FIG. 5B, these various connections are provided by the front and rear light bar cabling 10c and 12c, the switch box cabling 32, and the battery cabling 41. Thus, for example and as shown in FIG. 5B, the coupling 51 between the front light bar cabling and the front light bar provides both power and control signaling, the coupling 52 between the front light bar cabling and the switch box cabling provides only control signaling, and the coupling 53 between the front light bar cabling and the battery cabling provides only power.

Referring again to FIGS. 1A-C, 2A-C, 3A-B, and 4, the front and rear light bars 10 and 12 can be mounted to the HMMWV as follows:

To mount the front light bar: First, attach each of the two front mounts 10b (FIG. 1B) to the front light bar housing 10a with two ⅜"×1" bolts, two ⅜" lock washers, and two ⅜" washers, in that order. Leave all bolts slightly loose. Next, remove the existing left and right mirror assemblies from the HMMWV. Retain all hardware. Then replace the left and right mirror assembles on the HMMWV, with the light bar mounts between the mirror mounting brackets and the HMMWV body. Leave all bolts slightly loose. Next, adjust the light bar position as necessary so that the light bar does not touch the windshield wipers, so that it is level with the HMMWV, and so that the front face is vertical, i.e. so that the lights point straight out away from the vehicle, and aimed horizontally (not pitched up or down). Tighten all fasteners to secure the front light bar housing to the vehicle. Finally, place the front light bar cabling 10c through the door jamb (as shown in FIG. 1), and then route under the dashboard of the vehicle.

To mount the rear light bar: First, attach each of the two rear mounts 12b to the rear light bar housing 12a with two ⅜"×1" bolts, two ⅜" lock washers, and two ⅜" washers, in that order. Attach the top bolts first. Leave all bolts slightly loose. Next, determine where the rear light bar should be located on the rear body or deck of the HMMWV. It is best if the rear light bar does not interfere with any roof-mounted items. Place the rear light bar at the selected location, and mark on the vehicle the location of the bolt holes in the rear light bar housing. Next, drill 5/16" holes through the HMMWV body and deburr. Then attach the rear light bar housing to the HMMWV with four 5/16" bolts, four 5/16" washers, four 5/16" washers, four 5/16" lock washers, and four 5/16" nuts, in that order. Leave all hardware slightly loose. Next, adjust the light bar position as necessary so that the light bar is level with the HMMWV, and the rear face is vertical, i.e. so that the lights point straight out away from the vehicle, and aimed horizontally. Tighten all fasteners to secure the rear light bar housing to the vehicle. Finally, route the rear light bar cabling to the inside of the HMMWV.

Next, connect the battery cabling 41 to the battery. One cable of the battery cabling is red, which is to be connected to the positive terminal of the battery.

Next, install the switch box in the cab of the HMMWV, using four 1/4" screws, four 1/4" lock washers, and four 1/4" washers.

Finally, connect all cabling. First, connect the front and rear light bar power cables of the respective cabling 10c and 12c to the battery cabling 41, as described above, and also connect the switch box cabling to the battery cabling as described above. Then connect the switch box cabling to the front and rear light bar cabling 10c and 12c, as described above.

It can be appreciated by those skilled in the art that there are many ways to turn on and off the IR illuminators and/ or the flood lights of a front or rear light bar according to the invention, and that in different arrangements, the cabling for power to a light bar and to the switch box can be different. In particular, power for the switch box can be provided by tapping the power line to one or another of the light bars. In addition, power to both light bars can be provided through the switch box, in which case the switch box can include simple switches, instead of providing a control signal to close or open a relay in the light bars (and thus to turn on or off power to the light bars).

In a typical embodiment, the switch box has four switches, one for each of the two sets of flood lights (one set in the front light bar, and one in the rear), and one for each of the two sets of IR illuminators. In some embodiments, one switch controls all flood lights and one switch controls all IR illuminators.

Figure 6:
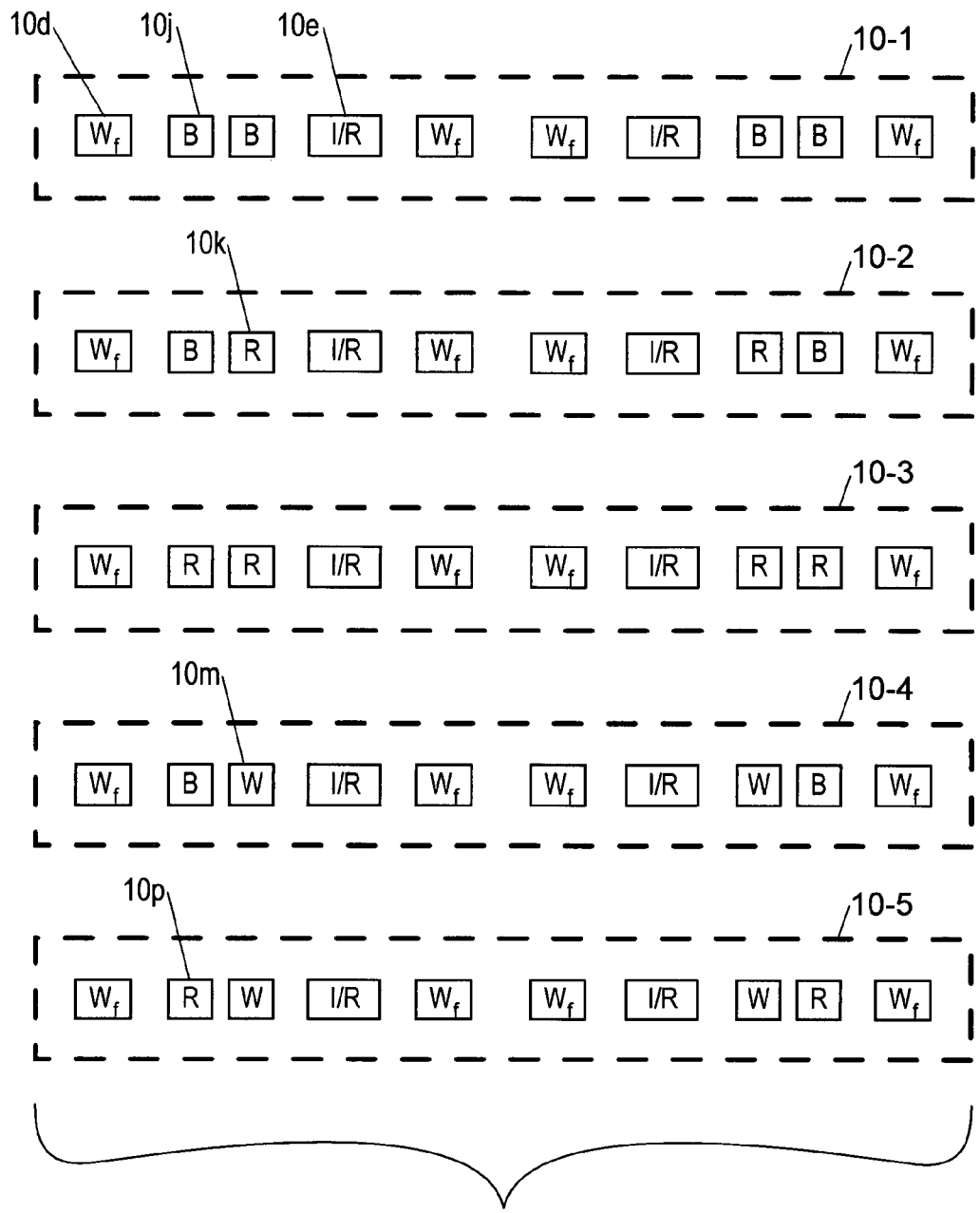
FIG. 6 is a block diagram/schematic of a light bar including various different strobe lights as well as flood lights and infrared illuminators.

Referring now to FIG. 6, various front light bars are shown including strobe lights, in replacement of some of the flood lights. Thus, a front light bar 10-1 is shown as including two infrared illuminators 10e as in FIG. 1, but only four white flood lights ($W_f$) 10d, and in replacement of the other two flood lights 10d of FIG. 1, two sets of two blue strobe lights 10j (i.e. four blue strobe lights 10j in all) are provided. Also shown is a front light bar 10-2 having two red strobe lights 10k and two blue strobe lights. Also shown is a front light bar 10-3 having four red strobe lights. Also shown is a front light bar 10-4 having two blue strobe lights and two white strobe lights 10m. Also shown is a front light bar 10-5 having two red strobe lights and two white strobe lights. All of these various arrangements and configurations are of course of use in particular military and civilian applications.

It is to be understood that the above-described arrangements are only illustrative of the application of the principles of the present invention. Numerous modifications and alternative arrangements may be devised by those skilled in the art without departing from the scope of the present invention.

What is claimed is:

1. A kit, for providing an apparatus for providing auxiliary illumination for a vehicle having a source of electric power, comprising:
   a light bar, including a housing holding at least one flood light and at least one infrared illuminator and respective relays connected thereto;
   a mounting bracket, for holding the housing to the vehicle, having an attach point for attaching to the housing and an attach point for attaching to the vehicle;
   a switch box, including switches for providing control signals to the relays connected to the at least one flood light and to the at least one infrared illuminator so as to switch on or off the at least one flood light and the at least one infrared illuminator; and
   cabling, for connecting the switch box to the source of electric power for providing electric power to the switch box, for connecting the at least one flood light and the at least one infrared illuminator to the source of electric power via the respective relays, and for connecting the switch box to the relays so as to enable providing the control signals to open or close one or more of the relays.

2. A kit as in claim 1, further comprising at least one strobe light and a relay connected thereto, and cabling for connecting the strobe light to the source of electric power via the relay connected to the strobe light, and for connecting the switch box to the relay connected to the strobe light, wherein the switch box further includes a switch for switching on or off power to the strobe light by closing or opening the relay connected thereto.

3. A kit as in claim 1, wherein the flood lights is a high intensity discharge flood light.

4. A kit as in claim 1, wherein the flood lights is a filament flood light.

5. A kit as in claim 1, wherein the light bar includes a shield rotatably attached to the housing so as to allow covering the flood light and the infrared illuminator in one position, and so as to allow blocking light from the flood light and the infrared illuminator from reaching the body of the vehicle, in another position.

* * * * *